United States Patent [19]

Spitzer et al.

[11] 3,912,666

[45] *Oct. 14, 1975

[54] EMULSIFIED PROPELLANT COMPOSITIONS FOR FOAMED STRUCTURES SUCH AS APPLICATOR PADS, AND PROCESS

[76] Inventors: Joseph George Spitzer, 722 Cove Road, Mamaroneck, N.Y. 10543; Marvin Small, 1100 Park Ave., New York, N.Y. 10028; Lloyd I. Osipow, 2 Fifth Ave., New York, N.Y. 10011; Dorethea C. Marra, 107 Fernwood Road, Summit, N.J. 07901

[ * ] Notice: The portion of the term of this patent subsequent to Oct. 14, 1992, has been disclaimed.

[22] Filed: June 4, 1973

[21] Appl. No.: 366,939

Related U.S. Application Data

[63] Continuation-in-part of Ser. No. 166,960, July 28, 1971, abandoned, and a continuation-in-part of Ser. No. 5,150, Jan. 22, 1970, abandoned, and a continuation-in-part of Ser. No. 797,257, Feb. 6, 1969, abandoned.

[52] U.S. Cl. ............... 260/2.5 E; 52/298; 106/122; 106/170; 128/260; 128/272; 132/87.7; 132/DIG. 3; 260/2.5 L; 260/2.5 AE; 260/2.5 AK; 260/2.5 HA; 260/2.5 N; 260/9 R; 260/13
[51] Int. Cl.$^2$ ....... C08J 9/12; C08J 9/26; C08J 9/30
[58] Field of Search ....... 260/2.5 L, 2.5 E, 29.6 PM, 260/29.6 MH; 106/122, 170

[56] References Cited
UNITED STATES PATENTS 3,640,916   2/1972   Dill .................................... 260/2.5 L
3,705,669   12/1972  Cox et al .......................... 260/2.5 L Primary Examiner—Morton Foelak

[57] ABSTRACT

Foam structures such as applicator pads for cleaning and other purposes are provided, that are formed from emulsified propellant compositions including a synthetic polymer in solution in a low boiling propellant and dispersed in an oil-in-water emulsion. Such compositions quickly form foamed structures containing open and/or closed cells at atmospheric temperature and pressure. The structures and propellant compositions include a material which is deposited in the pores and/or cells of the structure as the structure is formed, and which can be removed from the structure when desired. These structures are particularly suitable for use as applicator pads having a porous surface with a high proportion of open area, with a material such as a cosmetic, pharmaceutical, detergent, antimicrobial agent or abrasive which is contained in the pores thereof, and which can be removed.

The emulsified propellant compositions are stored in closed containers capable of withstanding an internal pressure sufficient to keep the propellant in the liquid phase at atmospheric temperature, and when the composition is withdrawn from the container to atmospheric pressure, the propellant volatilizes rapidly, and the foamed structure is formed within a few seconds.

45 Claims, No Drawings

EMULSIFIED PROPELLANT COMPOSITIONS FOR FOAMED STRUCTURES SUCH AS APPLICATOR PADS, AND PROCESS

This application is a continuation-in-part of Ser. No. 166,960 filed July 28, 1971, now abandoned, Ser. No. 797,257, filed in Feb. 6, 1969, now abandoned, and of Ser. No. 5,150 filed Jan. 22, 1970, now abandoned. A propellant is defined by the Chemical Specialties Manufacturers' Association as a liquefied gas with a vapor pressure greater than atmospheric pressure at a temperature of 105°F. A large class of organic compounds falls in this category, of which some are hydrocarbons, but most are halogenated hydrocarbons having one or two carbon atoms, and one or more chlorine, fluorine or bromine atoms. Frequently different halogens are substituted in the same molecule to impart the desired vapor pressure.

Because of their high volatility, propellants have been used as pore-forming agents in the production of plastic foams for many years. Propellants are soluble in many synthetic resins, and accordingly can be absorbed in the solid resin, which is desirably in particulate form, after which the resin containing the absorbed propellant is subjected to heat and pressure. The propellant vaporizes, and a closed cell foam structure is formed. U.S. Pat. No. 3,335,101 shows application of this process to the production of foams of chlorinated polyethylene. U.S. Pat. Nos. 2,387,730, 2,948,665, and 3,351,569 foam polyethylene and polypropylene in this way, U.S. Pat. No. 3,160,688 foams polystyrene, U.S. Pat. No. 3,352,802 foams polyvinyl chloride, U.S. Pat. No. 3,253,967 foams polyoxymethylene, and U.S. Pat. No. 3,310,617 foams a variety of thermoplastic resins by a similar but modified process intended to ensure that the propellant is uniformly dissolved or dispersed in the molten resin, so as to overcome the poor mixing problems of prior procedures.

In these procedures the amounts of propellants used are rather small, because only small amounts of the propellant can be absorbed in the solid resin, and the resin is molten, to facilitate foaming of the structure when the propellant is volatilized in situ to form the cells. The resin is then allowed to solidify before the structure can collapse, so as to preserve the foamed nature.

Randa, U.S. Pat. No. 3,072,583, patented Jan. 8, 1963, prepares foamed articles by extruding a perfluorocarbon resin in molten form, and containing from 0.1% to 5% by weight of fluoromethane. The fluoromethane dissolves in the resin at atmospheric pressure and room temperature, and is volatilized under the extrusion conditions so as to produce a foamed structure. This procedure is useful for coating wire with a foamed coating.

Raley and Skochdopole, U.S. Pat. No. 3,379,802, patented Apr. 23, 1968, describe a similar procedure for aliphatic olefin polymer blends, and U.S. Pat. No. 3,067,147 makes cellular polyethylene using 1,2-dichloro-1,1,2,2-tetrafluoroethane.

It has also been proposed that ultramicrocellular fibers be prepared with the aid of propellants. Blades and White, U.S. Pat. Nos. 3,227,664 and 3,227,784, patented Jan. 4, 1966, describe a flash extrusion process for this purpose. Supple, ultramicrocellular shaped structures are obtained from synthetic organic crystalline polymers by heating a confined mixture of the polymer plus at least one activating liquid at a temperature and pressure at which a homogeneous solution is formed, the temperature being greater than the normal boiling point of the liquid. This solution is then extruded abruptly to a region of substantially lower pressure and temperature under such conditions that a very large number of bubble nuclei exist at the extrusion orifice. Vaporization of the activating liquid rapidly cools the solution to the temperature at which the polymer precipitates and freezes in the polymer orientation produced in the rapid extrusion and expansion process.

The activating liquids must meet a number of requirements, of which one of the most noteworthy is that the liquid should dissolve less than 1% of the polymeric material at or below its boiling point. In other words, it is a nonsolvent for the polymer at or below its boiling point, but a solvent for the polymer under the extrusion conditions. to provide bubble nuclei at the instant of extrusion, a particulate solid nucleating agent can be incorporated in the polymer solution. Silica aerogel is a suitable nucleating agent. The result is a structure having extremely small closed cells. Modifications of this process are described in U.S. Pat. No. 3,081,519 to Blades et al., dated Mar. 19, 1963, U.S. Pat. Nos. 3,375,211 and 3,384,531 to Parrish, dated Mar. 26, 1968 and May 21, 1968, U.S. Pat. No. 3,375,212 to Bonner, issued Mar. 26, 1968, U.S. Pat. No. 3,461,193 to Gilardi, dated Aug. 12, 1969, and U.S. Pat. No. 3,467,744 to Woodell, dated Sept. 16, 1969.

Certain synthetic resins are soluble in propellants at room temperature. Bunting, U.S. Pat. No. 2,716,637, patented 1955, pointed out that when such solutions are volatilized quickly, fine bubbles of plastic resin are obtained, which initially retain sufficient solvent so as to possess a surface tackiness, but as the solvent continues to escape from the globules, they blister and acquire an unsatisfactory appearance. Bunting avoids this by combining a fatty acid with the resin propellant solution, and keeps the resin content of the solution rather low, within the range from 5 to about 12%. Similar compositions are described by Hochberg and Pellerano, U.S. Pat. No. 2,773,855, patented Dec. 11, 1956, and these workers point out that the particles obtained are in the form of small, hollow or solid semispheres ranging from 1/16 or ¼ inch in largest dimension. Coherent foamed masses are not obtained.

Gardner, U.S. Pat. No. 3,419,506, patented Dec. 31, 1968, prepares a protective film covering or dressing for wounds by dispensing from a pressurized container a composition comprising a film-forming vinyl acetate polymer or alkyl acrylate polymer, from 10 to 50% by weight based on the solids of a finely-divided filler, and a propellant, the solution having a viscosity of at least 1000 cp at normal room temperature. The inert filler must be present in order to obtain satisfactory foamed application of the film-forming resin, according to Gander, the filler perhaps serving as a nucleating agent, as described by Blades et al. in U.S. Pat. Nos. 3,227,784 and 3,227,664, and rather thin, tacky films are obtained, several mils in thickness.

In accordance with the invention of Ser. No. 5,150, structures such as applicator pads are provided, that are formed from propellant compositions including a film-forming synthetic polymer in solution in the propellant. Such compositions at atmosperic temperature and pressure form coherent, voluminous foamed structures, composed of a matrix of the synthetic polymer containing open or closed cells or both, in any desired proportion. The composition can include an additive which is deposited in the cells and/or walls (i.e., the polymer matrix) of the structure when the propellant volatilizes, and may exude or bleed from the structure, or may be expressed therefrom. Thus, the foamed structures of that invention have utility as applicator pads for a variety of materials, such as antimicrobial agents including bactericides and fungicides, cosmetics, detergents and other cleansing agents, antibiotics, astringents, and various types of medicaments.

The propellant compositions of the invention of Ser. No. 5,150 also are useful with or without the additive to form molded structures, which can be molded in open or closed molds under autogenous pressure at atmospheric temperature into a variety of shaped foamed structures.

The invention of Ser. No. 5,150 also provides a process for forming foamed structures from propellant compositions of this type, which makes it possible to control the relative proportions of open and closed cells in the resulting structure.

The propellant compositions in accordance with the invention of Ser. No. 5,150 comprise a film-forming synthetic resin in solution in a propellant having a boiling point below 45°F. at atmospheric pressure. The additive that may subsequently be disposed in the cells and/or walls of the foamed structure can be in solution in the propellant, or dispersed in the propellant, or in solution or in dispersion in a separate liquid phase that is itself dispersed in the propellant phase of the composition. Thus, the propellant compositions of that invention can be solutions or water-in-oil emulsions in which the propellant is the solvent in the continuous phase and another liquid or liquid composition or solid is dispersed therein in a discontinuous phase. Since the propellant boils at a temperature below 45°F., it is of course a vapor at room temperature and pressure. Consequently, the propellant compositions of the invention are stored in closed containers capable of withstanding the pressure of the propellant, so as to maintain the propellant in the liquid phase. When the composition is ejected from the container to atmospheric pressure at atmospheric (room) temperature, the propellant is rapidly volatilized, and a coherent foamed structure is formed, with the additive in the cells and/or walls.

It has been determined in accordance with the instant invention that emulsified compositions of the oil-in-water type, in which water is the continuous phase, and the solution of synthetic polymer in a propellant is the discontinuous phase, can be foamed to produce porous structures having a high proportion of open pores, if the aqueous phase includes a foam-stabilizing agent. The porous structures comprise interconnected cells or pores which extend throughout the structure, and have a material which is contained in the pores thereof, and which can be removed.

Accordingly, the essential components of the oil-in-water emulsions of the instant invention are an aqueous solution comprising a foam-stabilizing agent, which is the aqueous phase, and an oil phase consisting essentially of a polymer dissolved in liquefied propellant which is also a foaming agent. Thus when the pressurized composition packaged in a container is expelled through a valve into the atmosphere, the liquefied propellant immediately volatilizes, and foams both the oil phase and the aqueous phase, causing them to expand and the polymer to precipitate, resulting in the foamed structure.

Since the liquefied propellant of the compositions is almost entirely present in the oil phase of the emulsion, it might be thought that the oil phase would necessarily expand to a much greater extent than the aqueous phase. However, a part and perhaps even a major proportion of the propellant that volatilizes serves also to foam the aqueous phase. It is believed that this occurs by the following mechanism, but this is offered merely by way of explanation, since it has not been confirmed by unequivocal experimental evidence. The oil phase is initially present as dispersed droplets in the water phase. As propellant volatilizes in the oil phase to form a gas bubble surrounded by a film of polymer, propellant gas within the film can escape as readily from the outside of the film into the water phase as from the inside of the film into the gas bubble. Further, since there is a greater concentration of propellant gas within the gas bubble surrounded by the film of polymer than in the exterior water phase, there is constant diffusion of propellant gas from the interior of the bubble into the water phase. These bubbles of propellant gas foam the aqueous phase. If the aqueous foam is very stable, the aqueous phase foam volume may well be greater than the foam volume of polymer from the oil phase of the emulsion. On the other hand, if the aqueous foam is quite unstable, it will tend to collapse as it is being formed, and the volume of the plastic foam may be the greater.

Control of the relative foaming tendencies and foam volume of the aqueous and oil phases makes it possible to obtain a coherent resinous foamed structure, with aqueous phase in the pores and/or cells thereof. If the proportion of aqueous phase and aqueous foam volume is too high, and/or if the aqueous foam is too stable, a coherent foamed structure will not be obtained. Instead, the foamed resin will precipitate or disintegrate into foamed particles. The same result is obtained if the polymer is hard and brittle. To obtain a coherent foamed structure, the oil phase has to be present in a sufficient amount to permit the polymer precipitated from the dispersed oil phase droplets to unite and cohere during the foaming, and enclose the aqueous phase within the open pores and/or cells of the polymer structure. Usually this occurs if the foam volume of the oil phase or polymer is approximately equal to or is up to three times greater than the foam volume of the aqueous phase.

The polymer itself must also be soft and cohesive, but a hard polymer can be plasticized by temporary or permanent plasticizers to bring it to this condition.

It is not possible to establish precise and well-defined limits for the proportions of aqueous phase and oil phase, because the type and amount of foam stabilizing agent in the aqueous phase and propellant (foaming agent) in the oil phase also play a part. The type of polymer and its degree of plasticization are also factors. Knowing the effects of these factors, in keeping with the principles outlined above, it is possible by trial-and-error experimentation to arrive at the proportion suitable to produce a coherent foamed structure for any type of pressurized composition falling within the invention.

The foamed structure that is obtained can have open or closed cells or pores, or both, in any desired proportion. The proportion of open cells to closed cells in the foamed structure can be controlled by adjusting the stability of the liquid foam and the softness of the polymer, including the effect of plasticizers. The greater the stability of the liquid foam and the harder or less cohesive the polymer, the more open is the structure. However, if the liquid foam is too stable, or the polymer too hard, a coherent foamed structure may not be produced. Therefore, to obtain a coherent foamed structure, either the polymer must be softened, such as by addition of more plasticizer, or the stability of the liquid foam must be reduced. Used as a dressing for the topical application of a medicament, it need not have a high mechanical strength, and can be formed from a composition producing a fairly stable liquid foam and a polymer that is only slightly plasticized. In that event, the structure will have a high proportion of open pores. However, if the structure is to be used as an applicator pad by rubbing firmly against an object for the purpose of cleaning, it should have considerably greater mechanical strength. This often requires a liquid phase producing a less stable foam and a more highly plasticized polymer. In general, if the polymer is too soft or is overly plasticized, the pad will have poor rubbing qualities. Trial-and-error experimentation are required to determine the proper liquid foam stability and polymer softness for the mechanical strength needed for a specific application. The more open the pore structure, the weaker the structure. If high tensile strength is desired, the proportion of open area should be kept low.

It is advantageous that the liquid phase of the emulsion should have a low surface tension, preferably less than the critical surface tension for wetting of the resin, invariably less than 45 dynes per centimeter. Then the liquid phase will have a greater tendency to spread over exposed surfaces of the structure (interior and exterior surfaces), and interfere with the healing of ruptured pores, keeping the pores open and interconnected. If the wetting action is too low, the propellant becomes trapped in closed cells, and the proportion of open cells is too low. If it is too high, a coherent pad is not obtained, unless wetting is sufficiently restrained by the stability of the liquid foam.

Thus, the porous foamed structure is composed of a reticulated polymer matrix comprising the walls defining the pores and/or cells, and the relative plasticity or brittleness of this polymer to a considerable extent determines the proportion of through pores, connected by way of ruptured cell walls. The thinness of the walls is also a factor, but this is not readily controlled, except to the extent that it is dependent on the concentration of polymer in the propellant solution. In general, the more plasticized the polymer, the thicker the cell walls. If the plasticizer is volatile and fugitive, plasticity can be reduced with time, and thick-walled structures will become more rigid, and the walls will be broken when the structure is compressed or squeezed, as when it is used as an applicator, thus liberating any material held in the cells.

Accordingly, it is advantageous in accordance with the invention first to establish the foam stability and relative liquid and propellant phase proportions of a given emulsion system that yields an open pore coherent foamed structure, and then to adjust the proportion and size of the pores by control of plasticity, even if only for the time required for foaming and shortly thereafter by using a volatile plasticizer. One can in this way control the relative proportion of open cells, and even the stage at which closed cells will be opened. This control is obtained by controlling the amount and kind of plasticizer, so as to control both the degree of plasticization and the time during which the polymer is plasticized. The amount required necessarily varies with the polymer, the propellant and the plasticizer, as well as the kind of structure that is formed, and because of the number of variables an empirical determination is needed for each case, by trial-and-error experimentation.

The polymer is blended with a liquefied propellant, any plasticizer and/or a volatile solvent for the polymer or a liquid which in the presence of the other components has a solvent or plasticizing action on the polymer, and this is then emulsified in the organic liquid as a propellant-polymer-solution-in-liquid emulsion under the pressure sufficient to retain the liquefied propellant in the liquid phase. The emulsion is foamed to form a structure by reducing the pressure sufficiently to volatilize the propellant. A foam-stabilizing agent can be present in the water or added to the aqueous phase later. An additive may be present, but need not be. It may be advantageous if it affects polymer plasticity or solubility, viscosity, emulsion stability or foam stability. The structure can then be examined for the number of open and closed cells present, and if there are too many open cells, polymer plasticity can be increased, while if there are too many closed cells, polymer plasticity can be reduced. A determination can also be made empirically in terms of the amount of aqueous phase than can be expelled from the structure. In this way, the right structure can be obtained by adjustment of the formulation or the composition of the emulsion.

The oil-in-water emulsions of the invention can be prepared by blending the water, propellant, polymer particles, foamstabilizing agent, and any other ingredients, dissolving the resin in the propellant, and dispersing the resulting solution in the water phase. Because the polymer is soluble in the propellant phase, an aqueous latex of the polymer can be blended with foam-stabilizing agent and propellant, thereby dissolving dispersed resin particles in the propellant and dispersing the propellant solution in the aqueous phase. The foam-stabilizing agent can be present in the aqueous latex before addition of the propellant. The polymer can also be dissolved in the propellant, and the resulting solution dispersed in the aqueous phase containing the foam-stabilizing agent.

It may be advantageous to allow an extended time for dissolution of the polymer in the propellant, if polymer particles or an aqueous latex of polymer particles is used as a starting material. Dissolution may be slow, and aging of the emulsions may also be helpful, in producing a superior pad, for reasons not presently understood. Viscosity of the solution may be a factor in the ageing, since viscosity may diminish an ageing, depending on the polymer, and this can be advantageous.

As the propellant, there can be used in the compositions of the invention any volatile organic compound that has a boiling temperature below 45°F. at atmospheric pressure, and that is chemically inert to the polymer and the additive that may be present in the compositions. Thus, hydrocarbons such as propane, n-butane and isobutane can be employed, as well as halogenated hydrocarbons such as vinyl chloride, methyl chloride, methyl bromide, dichlorodifluoromethane (Propellant 12), 1,1-dichloro-1,1,2,2- tetrafluoroethane (Propellant 114), 1-chloro-1,1-difluoroethane (Propellant 142B), 1,1-difluoroethane (Propellant 152A), chlorodifluoromethane (Propellant 22), 1-chloro-1,1-difluoro-2,2-trifluoroethane (Freon 115), octafluorocyclobutane (Freon C318), a mixture of dichlorodifluoroethane and 1,1-difluoroethane (Freon 500), a mixture of chlorodifluoromethane and 1-chloro-1,1-difluoro-2,2,2-trifluoroethane (Freon 502).

The invention is applicable to any polymer that is soluble in a propellant falling within the above class or can be made soluble by the addition of a third material (such as a solvent or a material that shows solvent properties in the combination or the additive) and that is also film-forming, so that it tends to form a cohesive foam structure upon evaporation of a propellant solution thereof. Thermoplastic polymers as a class, thermosetting polymers in a propellant-soluble stage of polymerization, and propellant-soluble polymers capable of being cross-linked, can be used. The polymerization or cross-linking of the latter two types of polymers can be effected during or after the structure has been formed, to set the structure. Alkyl acrylate and alkyl methacrylate polymers and copolymers, such as ethyl methacrylate, butyl methacrylate, isobutyl methacrylate, 50/50 n-butyl/isobutyl methacrylate copolymer, 25/75 lauryl/isobutyl methacrylate copolymer, 30/70 stearyl/t-butyl methacrylate copolymer, 50/50 ethyl/n-butyl methacrylate copolymer, copolymers of acrylic and vinyl compounds, such as 50/50 vinyl toluene/isobutyl methacrylate copolymer, 50/35/15 vinyl toluene/t-butyl methacrylate/stearyl methacrylate terpolymer, 50/50 ethyl acrylate/vinyl acetate copolymer, certain other vinyl polymers, such as polyvinyl acetate, vinyl toluene-butadiene copolymers, carboxylated vinyl acetate, certain cellulose derivatives, such as ethyl cellulose, cellulose acetate, cellulose propionate, cellulose acetate butyrate and cellulose acetate propionate, and certain silicone polymers such as Silicone XC-20997, are soluble in propellants of the class set forth.

Polymers which can be set to a solvent-insoluble stage of polymerization chemically or by radiation include urethane prepolymers, unsaturated polyesters such as unsaturated alkyd resins, and polyolefins such as polybutylene and poly-2-methylbutene-1.

The polymer should have a molecular weight within the range from about 10,000 to about 1,000,000. Polymers of molecular weights below about 10,000 may not have sufficient cohesive strength to form a cohesive foamed structure, while those with molecular weights in excess of about 1,000,000 may be insoluble in propellant solvents. Polymers having molecular weights within the range from about 25,000 to about 600,000 are preferred.

The relative proportions and type of propellant and polymer in the propellant phase of the compositions of the invention determine to a considerable extent the nature of the foamed structure that is formed, when the pressure upon the emulsified composition is reduced, such as to atmospheric pressure, and the propellant allowed to volatilize rapidly. The composition should in the absence of water when expelled from an aerosol container form a cohesive foam. If the proportion of polymer is too low (and usually the lower proportion is not less than approximately 10% polymer by weight of the propellant phase) a cohesive foamed structure may not be formed, or if it is formed, it may disintegrate easily. The tendency instead is to form a bubbly, sticky, flowable foamed mass. If the proportion of polymer is too high, other difficulties will be encountered, due to the high viscosity of the polymer propellant solution (which affects the nature of the foam, as well as to the toughness of the resultant foamed structure). For example, if the propellant phase does not expand sufficiently, due to the high viscosity, a cohesive foamed structure may not be obtained. Further, if phase separation of the emulsion occurs, it may not be possible to effect reemulsification by hand shaking.

Usually, however, the composition may contain up to 50% by weight of polymer by weight of the total propellant phase, before performance is seriously impeded by the high proportion of resin, and sometimes as much as 70% polymer can be present, depending upon the molecular weight of the polymer and its solubility in the propellant that is used.

In addition to the propellant and the polymer, which are the essential ingredients of the propellant phase of compositions of the invention, the propellant phase can include additional less volatile or relatively nonvolatile solvents, which may be solvents or cosolvents for the polymer, or alternatively solvents for any additive that may be present, or which may be solvents for both the polymer and the additive. There may also be plasticizers for the polymer, coloring agents, fillers for the polymer which modify the polymer component of the foamed structure, and a curing agent for the polymer, if the polymer is in a partially polymerized condition, so that polymerization of the polymer can be completed after the foamed structure has been formed, to set the structure in a desired configuration.

It is usually preferred that liquid components of the propellant phase that are not propellants and that act as solvents for the polymer not exceed twice the weight of polymer present, and in most cases they should not exceed the weight of polymer present. In general, the amount of such solvent should also not be greater than the amount by weight of propellant present. However, the exact amount that can be tolerated will depend upon the concentration of polymer in the propellant composition, as well as whether the liquid is a good or poor solvent for the polymer.

Liquids which are higher boiling than the propellant will modify the foamed structure. If they are also solvents for the polymer, they may also plasticize the polymer during the period after the propellant has been volatilized, and before the remaining less volatile solvent is fully volatilized. Such a transitional plasticized stage can be useful in forming the foamed structure into a desired configuration, and it may also aid the formation of a higher proportion of closed or nonruptured cells.

Examples of solvents that boil at or above about 45°F. include dichlorofluoromethane, trichlorofluoromethane, 1,1,2-trichloro-1,2,2-trifluoroethane, 1,2-dibromo-1,1,2,2-tetrafluoroethane, 1,1,2,2-tetrachloro-1,2-difluoroethane, methanol, ethanol, acetone, methyl isobutyl ketone, benzene, toluene, xylene, chloroform, methylchloroform, methylene chloride, 1,1,1-trichloroethane, and perchloroethylene.

Plasticizers can also be incorporated. These are selected according to the nature of the polymer, and since they are nonvolatile permanently soften the foamed structure.

Plasticizers which may be used include butyl phthalyl butyl glycolate, tributyl citrate, acetyl tributyl citrate, tricresyl phosphate, dibutyl tartrate, dibutyl phthalate, di-2-ethylhexyl azelate, chlorinated biphenyl and methyl abietate.

Fillers for the polymer can be used as extenders for the polymer, and may also modify the physical properties of the foamed structure. The filler usually has a small particle size, although fibrous material also can be used. Satisfactory fillers include chalk, talc, silica, diatomaceous earth, clay, asbestos, magnesium silicate, calcium silicate, kaopolite powdered polyethylene and powdered polystyrene. The filler can be formed 0 to 300% by weight of the polymer. Coloring agents including dyes and pigments are used in small proportions, ranging from 0 to 10% by weight of the polymer.

The propellant phase of the compositions of the invention can be a homogeneous solution, in which all of the components present are soluble in and/or miscible with each other. In this case, any additive that is present is dissolved in the propellant with the polymer and is deposited in the cells of the structure when the propellant is volatilized as the structure is being formed. Any nonpropellant liquid will also be deposited in the cells, if it is insoluble in the polymer. Any additive dissolved in this liquid will be applied with the liquid from the cells of the structure when the foamed structure is used.

However, the foamable oil-in-water emulsified compositions of the invention usually are composed of two liquid phases, one of which, the propellant phase, is emulsified in water, with water serving as the continuous phase, but there can be more than one oil phase emulsified in the water phase, and such oil phases remain separate because they are wholly or partially immiscible in each other. The continuous water phase also can include, for example, a liquid solution of the additive. When the propellant is volatilized, and the foamed polymer structure is formed, the water phase (optionally comprising the additive) is then deposited in the pores and cells, as in the case of a propellant composition that is a homogeneous solution.

A solid additive can also be dispersed in the polymer-propellant solution phase, or in the water phase. It will be deposited in the cells and pores of the structure with the aqueous phase when the structure is formed. Preferably, in this case the solid additive is preferentially wetted by the water phase, remains dispersed in that phase, and can be removed from the pores as a dispersion in the water phase.

The foam-stabilizing agent has the function of stabilizing the foamed liquid which has been foamed by the propellant as it volatilizes to gaseous form. Any hydrophilic substance that forms a colloidal solution or dispersion in water can be used. Such substances are frequently referred to as "hydrophilic colloid", although a hydrophilic colloid is normally understood as an aqueous solution or dispersion. Because it is confusing, this term is not used herein, but any of the substances referred to by this term can be used. Such substances as a general characteristic have the property of lowering the surface tension of water when they are dissolved or dispersed therein. They may form either true solutions or colloidal dispersions or solutions in water, or dispersions that have the characteristics of both true solutions or colloidal dispersions or solutions. Such substances have the property of stabilizing propellant-produced foam long enough to permit formation of a stable resin foam in accordance with the invention.

One class of hydrophilic colloidal solution or dispersion-forming compounds are the organic surfactants. The aqueous phase can be formulated to contain single or multiple surfactants, such as soaps and anionic synthetic surfactants or soaps and nonionic synthetic surfactants, or they can be composed wholly of synthetic surfactants, including the anionic, catonic and nonionic types. The known types are listed by McCutcheon's *Detergents and Emulsions Annual*, 1970 (The Allured Publishing Company, Ridgewood, N.J.). Any of the surfactants listed by McCutcheon, the disclosure of which is hereby incorporated by reference, can be used.

Typical satisfactory anionic nonsoaps are the alkyl sulfates, such as sodium lauryl sulfate; the alkyl aryl sulfonates, such as sodium polypropylene benzene or toluene sulfonates and the sodium keryl benzene or toluene sulfonates; the sulfated ethoxylated phenols, such as the ammonium salt or sulfated ethoxynated nonyl phenol, prepared by condensation of nonyl phenol with five moles of ethylene oxide; the sodium fatty acid esters of taurine, such as sodium palmitic or oleic methyl tauride or mixtures thereof; the esters of higher fatty acids and hydroxy ethane sulfonates, such as oleic acid ester of hydroxy ethane sodium sulfonate; sodium lauroyl sarcosinate; sodium stearoyl lactate; sodium lauroyl lactate; sodium dioctyl sulfosuccinate; sodium lauroyl isethionate, and sodium lauryl sulfoacetate. Also useful are nonionic nonsoaps, such as the polyethylene glycol esters of the higher fatty acids, for example, polyethanoxy esters of lauric, myristic, palmitic and stearic acids, polyethanoxy ethers of lauryl alcohol, cetyl alcohol, oleyl alcohol and lanolin alcohol, the polyethanoxy ethers of alkyl phenols, such as the condensation product of octyl and nonyl phenol with five to fifty moles of ethylene oxide; the higher fatty acid esters of sorbitan-ethylene oxide condensates, such as the polyethanoxy esters of sorbitan monostearate; polyethanoxypolypropanoxy polyols. Cetyltrimethylammonium bromide is a typical cationic nonsoap.

The term "soap" as used herein refers to alkali metal, ammonium, and amine soaps of the saturated and unsaturated higher fatty acids having from about eight to about 26 carbon atoms, such as capric, caprylic, lauric, myristic, palmitic, stearic, oleic, linoleic, linolenic, arachidic, behenic, margaric, tridechoic, and cerotic acids and the mixtures of such acids naturally occurring in fats, oils, waxes and rosins, such as the soaps of coconut oil fatty acids, tallow fatty acids, lard fatty acids, fish oil fatty acids, beeswax, palm oil fatty acids, palm kernel oil fatty acids, corn oil fatty acids, babassu oil fatty acids, rosin acids, abietic acid, and greases.

These soaps and synthetic surfactants are also hydrophilic emulsifying agents, and exhibit a pronounced tendency to form oil-in-water emulsions in which water is the continuous phase. They thus assist in maintaining the oil-in-water characteristic of the emulsions.

Another class of hydrophilic colloid solution or dispersion-forming compounds include the water-soluble and water dispersible natural and synthetic gums, such as methyl cellulose, sodium carboxymethyl cellulose, cellulose sulfate, hydroxyethyl cellulose, hydroxymethyl cellulose, hydroxypropyl cellulose, guar gum, polyvinyl pyrrolidone, the alginates, polyvinyl alcohol, gum arabic, gum tragacanth, gum karaya, polyacrylic acids, and salts thereof, such as ammonium polyacrylate, polypeptides and derivatives thereof, and the hydrophilic clays such as the montmorillonite clays.

If the foam-stabilizing agent is too effective, and produces a too-stable foam, one or more water-soluble organic solvents or mixture of such solvents can be added to the aqueous phase. Too high a concentration of water-soluble organic solvent may suppress foaming excessively, and in general the amount of such foam suppressant is within the range from about 25% to about 80% by weight of the aqueous phase. The foaming action of the aqueousphase may also be suppressed by increasing the concentration of the foam-stabilizing agent above the amount where foaming is at a maximum, according to the foam-stabilizing agent. Examples of water-soluble organic solvents that can be used include methyl alcohol, ethyl alcohol, isopropyl alcohol, n-propyl alcohol, t-butyl alcohol, acetone and glycerol.

The water-soluble organic solvent may partition between the water phase and the propellant phase. If it does, it may alter the solubility of the polymer in the propellant phase, the viscosity of the propellant phase, and the plasticity of the polymer. These changes may be advantageous or disadvantageous, according to the emulsion.

The amount of aqueous phase that can be used in the composition is limited by various factors. The lower limit of aqueous phase is established by the amount required for the formation of an oil-in-water emulsion. Generally, this is not less than about 10% by weight of the total emulsion, and more commonly at least about 25% by weight of the total emulsion is required. The upper limit of the aqueous phase is established by the amount that will interfere with the formation of a cohesive foamed structure. If the aqueous phase produces a stable foam, too large a proportion of the phase will interfere with the formation of a foamed structure. If the aqueous phase gives an unstable foam, it may prematurely wet out the polymer as the foamed structure is being formed, preventing cohesion of the polymer to form a structure, and producing wet, foamed ribbons, rather than a cohesive foamed structure. Further, if the amount of aqueous phase is too high, any structure that may form will be very weak. The aqueous phase should not exceed about 75% by weight of the total emulsion, and generally, it should not be more than about 60% by weight of the total emulsion.

The amount of foam-stabilizing agent present in the aqueous phase is not critical. It may be as little as 0.01%, or as much as 20% or more by weight.

Any additive that is dispersible in the water phase or is soluble in the water phase, and is not chemically attacked by components of either phase, can be incorporated in the compositions of the invention, and will remain with the water phase in the foamed resin structure after the propellant has been volatilized. The additive will always be found in the cells and pores with the water phase after the structure is formed. If it is soluble in the water phase, a water phase solution of the additive is present in the cells. If it is dispersible in the water phase, it will be found dispersed therein, and this is particularly so when the additive is a water-insoluble solid. As used herein, the term "additive in liquid form" means an additive which is a liquid or liquid solution or which is a solid dissolved in or dispersed in water so as to be in liquid form.

Apart from these requirements, which are purely physical, any type of additive can be employed, depending upon the intended use for the structure.

When alternative additives are available to perform the same function, it is preferable to select the additive that is comparatively insoluble in the polymer and is quite soluble in the water phase that will subsequently occupy the cells and pores of the foamed structure.

In general, the aqueous solution is or contains the functional additive of the foamed polymer structure, and is deposited in the cells and pores of the foamed polymer structure. The foam-stabilizing agent itself can be the additive, since many aqueous surfactant solutions have cleaning properties, which of course vary with the surfactant. Thus, sodium lauryl sulfate is a better cleaning agent than an ethoxylated oleic acid. An aqueous solution of a cationic nonsoap such as cetyltrimethylammonium bromide has antiseptic and deodorizing properties.

Any water-soluble additives can be included in the aqueous solution to achieve specific effects. Glycerol and the aliphatic lower glycols serve as cosmetic moisturizers, humectants and lubricants. Aluminum chlorhydroxide (5/6 basic) serves as an antiperspirant and as a styptic. Pramoxine hydrochloride is a water-soluble local anesthetic. Alcohol and glycols can be used in the aqueous solution to increase the solubility of additives that are poorly soluble in water. Relatively high concentrations of organic surfactants can be used to dissolve insoluble compounds in the water phase, due to the solubilizing action of the surfactants. Hydrophilic insoluble solids such as silica, which is used as an abrasive, will preferentially distribute in the water phase.

A liquid that is normally present in the propellant phase of the emulsion but is not compatible with the polymer may also serve as the functional additive. When the composition is converted to a foamed structure, this liquid will separate from the polymer matrix and occupy the pores. Dimethylpolysiloxane is incompatible with most polymers and will separate out in this manner. This silicone will function as a glossing agent when the foamed structure is a pad used for polishing. The liquid that separates from the polymer in this manner may also serve as a solvent for other additives.

In one form of the invention, a codispensing valve may be used. Such valves are capable of simultaneously mixing and dispensing materials from two separate compartments. Thus, one compartment would contain the pad-forming oil-in-water emulsion including a water-soluble reducing agent. The other compartment would contain a water solution of hydrogen peroxide. The expelled product would be a warm pad. If the pad contained as additives essential oils, such as oil of wintergreen, menthol, or camphor, the heat would aid in the release of these aromatic ingredients, and this could be medicinally beneficial.

The foamed structures of the invention, for example, are particularly useful as applicator pads for external or topical application of cosmetics of all types, such as those intended for cleansing, conditioning, coating, lubricating, and protecting the skin, hormone preparations, suntan preparations, skin lighteners and bleach creams, foundation makeups, eye makeups, pre-shave and after-shave preparations, depilatories, hair grooming preparations, permanent wave preparations, hair straightening preparations, anti-dandruff preparations, bath preparations, nail lacquers and removers, antiperspirants and deodorants, fragrance-imparting preparations, perfumes, baby toiletries, and hypoallergenic cosmetics. They are also useful applicators for soap and synthetic detergent preparations of all types for personal washing, laundering dishwashing, cleansing of silver, shampoos, shaving soaps and creams, hair colorings and dye removers, wave sets, lacquers, rinses and conditioners, and dry shampoos. They are also useful applicators for medicaments and medicament coatings of all types, anti-microbial agents, such as bactericides and anti-fungal agents of all types, and antibiotics, for external application, such as topical or rectal, for instance, as suppositories.

The structures are also useful for furniture applying coatings and polishes, such as furniture polish, shoe polish and furniture and shoe cleaners, floor cleaners, automobile cleaners and polishes, and porcelain, tile and plastic cleaners. When abrasives are included as the additive, they can serve as abrasive pads and scouring pads.

Exemplary medicaments that can be combined in the oil-in-water emulsions of the invention include the antihistamines, sulfa drugs, for example, sulfadiazine, sulfabenzamide, sulfacetamide, sulfanilamide, sulfapyridine, sulfathiazole, sulfapyrazine, sulfaguanidine, sulfaphthalidine, sulfasuxidine, sulfaoxazole, sulfamylon, phthalylsulfacetamide, $N'$-3,4-dimethylbenzoylsulfanilamide, benzylsulfanilamide and $N'$-2(2-quinoxalyl) sulfanilamide; lipotropic agents, such as methionine, choline, inositol and beta-sitosterol and mixtures thereof; local anesthetics, such as benzocaine and pramoxine hydrochloride; essential oils, such as menthol, eucalyptus oil and eugenol; salts of penicillin, such as potassium penicillin G, procaine, penicillin G, 1-ephenamine penicillin G, dibenzylamine penicillin G, and other penicillin salts disclosed in U.S. Pat. No. 2,627,491; phenoxymethylpenicillin and salts thereof; additional antibiotic agents, such as streptomycin, dihydrostreptomycin, bacitracin, polymixin, tyrothricin, erthromycin, chlortetracycline, oxytetracycline, tetracycline, oleandomycin, chloramphenicol, magnamycin, novobiocin, cyclosterine and neomycin; vitamins, for instance, vitamins A, $A_1$, $B_1$, $B_2$, $B_6$, $B_{12}$, and members of that family, folic acid and members of that family, and vitamins C, $D_2$, $D_3$ and E; hormones, such as cortisone, hydrocortisone, 9-$\alpha$-fluorocortisone, 9-$\alpha$-fluorohydrocortisone, prednisone and prednisolone; anobilic agents, such as 11,17-dihydroxy-9-$\alpha$-fluoro-17-o-methyl-4-androsten-3-one and 17-$\alpha$-ethyl-19-nor-testosterone, and additional antimicrobial agents, such as mycostatin, mercurichrome, iodine, methiolate, hexachlorophene, tribromalsalicylanilide, trichlorocarbanilide, and undecylenic acid.

These medicaments can be compounded in the forms of solutions and elixirs with suitable solvents and dispersants, such as are conventionally used in such formulations. Aqueous and alcoholic solutions usually are used. The amount of medicament is not critical, and is chosen to meet the need; usually, from 0.02 to about 15% is adequate.

Various aqueous preparations, including elixirs and oil-in-water emulsions which may contain cosmetic and toiletry ingredients, medicaments, and cleansing agents, can be compounded so that they can be emulsified with polymer and propellant in sufficient concentration for an applicator pad to form and for the preparation to ooze from the applicator pad.

Many of the organic compounds that are used in cosmetic lotions, such as mineral oils and fatty esters, serve as plasticizers for some resins. Care should be exercised in the combination of organic compounds and polymer that a useful applicator pad is obtained.

In one form of this invention, a codispensing valve may be used. Such valves are capable of simultaneously mixing and dispensing materials from two separate compartments. Thus, one compartment would contain the pad-forming composition and the other would contain the cosmetic or other additive.

The emulsified oil-in-water propellant compositions of the invention are converted into foamed polymer structures when the propellant is permitted to volatilize. This is easily accomplished, with almost immediate volatilization of a substantial proportion of the propellant, by storing the propellant composition in a closed container, where the autogenous pressure is sufficient to maintain the propellant in the liquid phase, and then rapidly reducing the pressure to atmospheric pressure at room temperature, whereupon the propellant rapidly volatilizes and the foamed structure is formed. The emulsified oil-in-water propellant compositions may also be stored in a closed container, under applied pressure greater than the autogenous pressure arising from the propellant itself to facilitate expelling the composition from the container, as through a valve or orifice, into the atmosphere. Because of the high volatility of the propellants employed, the polymer structure is non-sticky, unless a plasticizer or other nonpropellant solvent for the polymer is also present in sufficient amount to impart a sticky characteristic to the polymer. If the structure is to be adhered to a surface, stickiness can be desirable. In the case of a solvent that also volatilizes, although more slowly than the propellant, this sticky condition is transitory, however, and exists only until the solvent has been removed. Excessive stickiness is undesirable in an applicator pad.

If a composition formulated to produce a pad with a high proportion of closed cells is ejected into a confined space, such as a mold, preferably closed, the foamed structure will acquire the configuration of the mold, and a molded object is obtained. The molding can be carried out at room temperature, without application of external pressure, since a pressure sufficient to ensure that the structure conforms to the configuration of the mold is obtained upon volatilization of the propellant at atmospheric pressure and temperature.

If the emulsified oil-in-water composition is ejected into the atmosphere, the foamed structure will have an irregular shape. It is quite convenient, in practicing this embodiment of the invention, simply to eject the composition from the container into the hand, forming a pad of any desired size, which is controlled by controlling the duration of the ejection period. For this purpose, the propellant compositions of the invention are suitably packaged in aerosol containers of the standard type, the valve being controlled by one hand, and the foamed structure being received in the other. The foamed structure is formed almost instantaneously, and the applicator pad is ready for use within seconds after the procedure has begun. The structure is shape-retaining because of the nature of the polymer used, and it is also flexible initially because of the retention of some propellant, even if no plasticizer is present, i.e., if the polymer is a rigid polymer.

Alternatively, the valve actuator may be shaped as a dish or a hemisphere so that it acts as a receptacle or mold for the foamed structure as it is being formed, and the interior shape of the receptacle or mold determines the shape of the foamed structure.

The foamed structures can be stretched to some extent and compacted as they are being formed, and in this way can be made to conform to the shape of the object upon which it is being applied, so as to form a covering or a coating. When applied to the body, for example, a coating including a medicament for release to the skin can be formed, which can be allowed to remain in contact with the skin for long periods, for slow release of the medicament over a long period of time. However, because the emulsified compositions are so rapidly converted into a foamed structure, they are not actually flowable, and will not spread voluntarily. In this respect, they differ from conventional aerosol paints or lacquers, from which the solvent is removed only slowly, and which are consequently flowable, and can be spread out to a film that may be only a few mils thick, and they also differ from the spreadable compositions described in U.S. Pat. No. 3,419,506 to Gander.

Prior to expulsion from the container, however, the emulsified compositions are flowable. The viscosity of the fluid composition is in no way critical, provided the composition is sufficiently flowable to be ejected from the container under pressure. The viscosity, accordingly, can range from a thin, quickly flowable liquid, to a rather thick, barely flowable, thixotropic or gel-like composition.

When the dispersed propellant phase remains uniformly distributed in the water, the viscosity may be as high as 1,000,000 cp at atmospheric temperature. However, when the emulsion is likely to undergo settling or layering and it is necessary to shake before expelling a portion of the contents, it is necessary that the viscosity not exceed about 50,000 cp, and preferably it should be less than 10,000 cp, at atmospheric temperature.

In the event that the propellant employed in the compositions of the invention has a sufficient vapor pressure at ambient temperature, it will also serve as a propellant to expel the material from the pressurized container in which it is confined. In the event that its vapor pressure is insufficient, additional pressure may be provided in the container by a suitable pressurizing gas, such as nitrogen, nitrous oxide or carbon dioxide. Because commercial regulations limit the total pressure of common aerosol containers to not more than about 150 psig, the propellant employed is preferably one whose vapor pressure in the propellant composition does not exceed this limit.

The emulsified propellant compositions of the invention can be packaged in containers of the type commonly known as an aerosol can, fitted with a discharge valve which will allow a foamed discharge.

The emulsified propellant compositions are prepared by conventional procedures. For example, the solid and normally liquid ingredients may be combined and stirred until the composition is uniform. Suitable portions are then filled into individual aerosol cans, which are capped and pressurized in conventional fashion with the normally-gaseous liquefied propellants. The individual packages are shaken or otherwise agitated until the polymer dissolves and the composition is uniform. Alternatively, all of the ingredients may be combined and stirred in an autoclave until the polymer dissolves and the composition is uniform. The cans are filled and capped before releasing the pressure on the material. With any of these procedures, heat can be used to increase the rate at which the polymer dissolves.

In another embodiment, the aerosol can will contain a piston or bellows which separates the interior of the can into two compartments or zones. The first compartment, which contains the material to be dispensed, is in communication with the discharge valve. The second compartment is filled with a secondary propellant which provides pressure in the container which is in excess of the vapor pressure of the composition in the first compartment. The secondary propellant may be a compressed gas such as nitrogen or a normally-gaseous liquid propellant. The latter is preferred since it provides a constant back-up pressure to expel the material. Examples of such cans are disclosed in U.S. Pat. Nos. 2,815,152, 3,245,591 and 3,407,974.

The following Examples in the opinion of the inventors represent preferred embodiments of the invention.

EXAMPLES 1 TO 3

A group of oil-in-water emulsions, suitable for use in preparing foaming cleaning pads, was prepared as follows:

The aqueous phase was composed of 2 parts by weight triethanolamine lauryl sulfate and 98 parts of water.

The propellant solution of vinyl toluene-acrylate copolymer (Pliolite VTAC) in Propellant 11 trichlorofluoromethane and Propellant 12 dichlorodifluoromethane had the following composition:

| Example No. | Parts by Weight | | |
|---|---|---|---|
| | 1 | 2 | 3 |
| Propellant Phase | | | |
| Vinyl Toluene-Acrylate Copolymer | 30 | 30 | 30 |
| Propellant 11 (Trichlorofluoromethane) | 37 | 37 | 37 |
| Propellant 12 (Dichlorodifluoromethane) | 35 | 35 | 35 |
| Aqueous Phase | 40 | 60 | 80 |

The ingredients were mixed and heated in aerosol cans in the amounts shown to form an oil-in-water emulsion. The emulsions were expelled from the aerosol cans into the palm of one hand, and formed into pads. The emulsion of Example 1 produced a plastic foam which was initially dry to the touch, but which when squeezed exuded the aqueous solution of triethanolamine lauryl sulfate, which foamed readily, and could be used as a shampoo. Examples 2 and 3 formed wet foamed applicator pads which were more open than the pad of Example 1, and freely liberated the shampoo composition, which had good foaming and washing properties.

EXAMPLE 4

An oil-in-water emulsion suitable for use as a non-foaming shampoo applicator pad was prepared as follows:

The aqueous phase was composed of 5 parts by weight of Brij 30, a polyoxyethylene lauryl ether (containing 4 mols of oxyethylene units per mol), in 95 parts of water. The propellant phase for the oil-in-water emulsion had the composition:

| Example No. | Parts by Weight 4 |
|---|---|
| Propellant Phase | |
| Pliolite VTAC | 30 |
| Vinyl Toluene-Acrylate Copolymer | |
| Propellant 11 | 37 |
| (Trichlorofluoromethane) | |
| Propellant 12 | 35 |
| (Dichlorodifluoromethane) | |
| These were then mixed with the amount of aqueous phase shown, to form an oil-in-water emulsion: | |
| Aqueous Phase | 60 |

The ingredients were mixed in the amounts shown and heated to dissolve the polymer and form an oil-in-water emulsion in aerosol cans. A portion of the emulsion was expelled into the palm of the hand, and a pad formed which was light, fluffy and cohesive, and which could be squeezed to a thin, tough, wet applicator pad, which exuded an aqueous shampoo solution with good cleansing properties, due to the polyoxyethylene lauryl ether content.

EXAMPLE 5

An oil-in-water emulsion suitable for forming shampoo applicator pads having good lathering and cleansing properties was prepared as follows:

An aqueous shampoo solution was formed of 5 parts of triethanolamine lauryl sulfate and 95 parts of water. This was then blended with a propellant solution of vinyl toluene-acrylate copolymer in Propellant 11 and Propellant 12 of the following composition:

| Example No. | Parts by Weight 5 |
|---|---|
| Propellant Phase | |
| Pliolite VTAC | 30 |
| Propellant 11 | 37 |
| Propellant 12 | 35 |
| These were then mixed with the amount of aqueous phase shown, to form an oil-in-water emulsion: | |
| Aqueous Phase | 60 |

The composition was thoroughly emulsified under pressure, and then packaged in aerosol containers. When the emulsion was expelled from the aerosol container a cohesive, soft, foamy pad was prepared that gradually over a minute or two became firm and tough. When passed over a surface, the pad readily exuded the aqueous triethanolamine lauryl sulfate solution, which displayed good cleansing and lathering properties.

EXAMPLES 6 AND 7

Two different oil-in-water emulsions capable of forming applicator pads capable of liberating an aqueous alcoholic shampoo composition were prepared as follows:

The aqueous phases had the following composition:

| Example No. | Parts by Weight | |
|---|---|---|
| | 6 | 7 |
| Aqueous Phase | | |
| Polyoxyethylene Lauryl Ether containing 4 Mols Oxyethylene Units per Mol (Brij 30) | 5 | 5 |
| Isopropanol | 7.5 | 15 |
| Water | 92.5 | 85 |

Two propellant solutions were prepared of polyvinyl acetate resin, Vinylite AYAT, 28.5 parts by weight in 55 parts by weight Propellant 142B 1-chloro- 1,1-difluoroethane. These solutions were each blended with 45 parts by weight of the aqueous solution, and thoroughly emulsified, forming oil-in-water emulsions, and then packaged in aerosol containers.

When expelled from the aerosol container into the palm of one hand, these emulsions each produced cohesive, fluffy, tough, wet applicator pads, which freely exuded the aqueous detergent solution when squeezed. The pad of Example 6 was less plasticized than Example 7, and showed better durability when rubbed over a surface to apply the aqueous solution of polyoxyethylene lauryl ether. The solution displayed good cleansing properties.

EXAMPLES 8 AND 9

Two aqueous solutions were prepared, having the following composition:

| Example No. | Parts by Weight | |
|---|---|---|
| | 8 | 9 |
| Aqueous Phase | | |
| Polyoxyethylene Lauryl Ether containing 4 Mols Oxyethylene Units per Mol (Brij 30) | 5 | 5 |
| Isopropanol | 27 | 47.5 |
| Water | 68 | 47.5 |

A propellant solution of cellulose acetate butyrate (EAB-451-1) 40 parts, in Propellant 142B (1-chloro-1,1-difluoroethane) 110 parts, was prepared, and 75 parts of this was blended with 45 parts of the aqueous solution noted above, and thoroughly emulsified therein under pressure. The resulting oil-in-water emulsions were then packaged in aerosol containers.

When expelled from the container, Example 8 gave a cohesive pad, of irregular shape. The pad was very fibrous and had an open-cell structure. Example 9 gave a more cohesive pad, of regular shape, which was considerably tougher, and also had a fibrous open-cell structure. The aqueous polyoxyethylene lauryl ether solution exuded freely from each pad when the pad was squeezed or passed over the surface of the skin, and showed good cleansing properties.

EXAMPLES 10 AND 11

An aqueous solution was prepared, composed of 3.8 parts triethanolamine lauryl sulfate, 38 parts of 95% ethyl alcohol, and 58.2 parts by weight of water. This solution was then blended with propellant solutions having the following formulation, to form oil-in-water emulsions in accordance with the invention:

| Example No. | Parts by Weight | |
| --- | --- | --- |
| | 10 | 11 |
| Oleyl Alcohol | 3.5 | 7 |
| Polyisobutylmethacrylate Elvacite 2045 | 22 | 22 |
| Propellant 114 1,2-dichlorotetrafluoroethane | 77 | 77 |
| Propellant 12 Dichlorodifluoromethane | 28 | 28 |

The Example 10 formulation was blended with 56.5 parts of the aqueous solution, and Example 11 formulation was blended with 53 parts of the aqueous solution. The two compositions were thoroughly emulsified under pressure, and packaged in aerosol containers.

When expelled from the aerosol container into the palm of the hand, Example 10 gave a cohesive, tough, foamy, wet pad, with an open structure. Example 11 was similar, but the pad was softer, and the structure was less open. The triethanolamine lauryl sulfate alcohol solution exuded freely from each pad, especially when the pad was squeezed. The pad displayed good cleansing and foaming properties, and was useful as an antiseptic cleanser.

EXAMPLE 12

An oil-in-water emulsion suitable for use in preparing antiperspirant or styptic applicator pads was prepared as follows:

An aqueous phase was prepared composed of 19 parts of water, 19 parts of 95% ethyl alcohol, 4.5 parts of propylene glycol, and 2 parts polyoxyethylene lauryl ether containing 4 mols of oxyethylene units per mol (Brij 30).

A propellant solution was prepared of polyisobutyl methacrylate (Elvacite 2045) (22 parts) in Propellant 114 1,2-dichlorotetrafluoroethane (39 parts), Propellant 12 dichlorodifluoromethane (35 parts), mineral oil (24 parts), hexadecyl alcohol (1.5 parts). These compositions were thoroughly mixed, and then there was blended in aluminum chlorhydroxide complex 5/6 basic (9 parts). The resulting oil-in-water emulsion was packaged in aerosol cans.

The composition was expelled from the aerosol can into the palm of one hand and formed into a pad. A plastic foam was produced which was initially dry to the touch, but which when squeezed exuded the aqueous solution and could be used as an applicator pad for the aluminum chlorhydroxide for antiperspirant use or as a styptic pad utilizing the astringent properties of the aluminum chlorhydroxide.

EXAMPLE 13

An oil-in-water emulsion was prepared, suitable for use for preparing foamed antiseptic applicator pads. The antimicrobial agent was a polyvinyl pyrrolidone-iodine complex containing 10% iodine.

An aqueous phase was prepared composed of 1.2 parts by weight triethanolamine lauryl sulfate and 56 parts of water.

A propellant solution of vinyl toluene-acrylate polymer Pliolite VTAC was prepared containing 30 parts of the polymer in 37 parts of Propellant 11 trichlorofluoromethane and 35 parts of Propellant 12 dichlorodifluoromethane.

Two parts of the polyvinyl pyrrolidone 10% iodine complex was dissolved in the water, and the two solutions then combined and thoroughly mixed under pressure, forming an oil-in-water emulsion which was packaged in aerosol cans.

The composition was expelled from the aerosol can into the palm of one hand and formed into a pad. A plastic foam was produced which was wet to the touch and liberated an aqueous dispersion of the polyvinyl pyrrolidone-iodine complex when squeezed. The pad could be used as an applicator for applying the antimicrobial agent to a wound, cut or abrasion for antiseptic purposes.

EXAMPLE 14

An oil-in-water emulsion was prepared suitable for use in preparing an aantiperspirant pad with aluminum chlorhydroxide complex serving as the antiperspirant.

An aqueous phase was prepared composed of 3 parts of Tween 20 polyoxyethylene sorbitan monolaurate (containing 20 oxyethylene units per mol of polyoxyethylene sorbitan monolaurate) dissolved in 45 parts of water. Twelve parts of aluminum chlorhydroxide complex 5/6 basic was then combined with this aqueous solution.

Thirty parts by weight of Pliolite VTAC vinyl toluene-acrylate copolymer were then dissolved in 37 parts of propellant 11 trichlorofluoromethane and 35 parts Propellant 12 dichlorodifluoromethane.

The two phases were thoroughly mixed under pressure, and packaged in aerosol cans. An oil-in-water emulsion was formed with the aluminum chlorhydroxide complex in the aqueous phase.

The composition was expelled from the aerosol can into the palm of one hand and formed into a pad. A plastic foam was produced which was initially dry to the touch, but which when squeezed exuded an aqueous solution of the aluminum chlorhydroxide complex which was useful as an antiperspirant applicator or as an astringent.

EXAMPLE 15

An oil-in-water emulsion capable of forming perfume pad applicators was prepared as follows.

An aqueous phase was prepared composed of 23 parts of water and 11 parts of 95% ethyl alcohol in which was dissolved 0.4 part of Tween 20 polyoxyethylene sorbitan monolaurate containing 20 mols per mol of oxyethylene units.

A propellant solution of polyisobutyl methacrylate Elvacite 2045 22 parts by weight was formed in 39 parts Propellant 114 1,2-dichlorotetrafluoroethane and 35 parts Propellant 12 dichlorodifluoromethane. To this solution was added 2.7 parts oleyl alcohol, 32 parts of mineral oil 350 SSU, and 5.4 parts perfume oil.

These compositions were thoroughly mixed under pressure, and then packaged in aerosol cans.

An oil-in-water emulsion was formed which when expelled from the aerosol can into the palm of one hand formed a pad which was wet and freely exuded a perfumed body oil aqueous dispersion suitable as an applicator to the body after showering or bathing.

EXAMPLE 16

An oil-in-water emulsion suitable for use in preparing an applicator pad for a cosmetic moisturizing lotion was prepared as follows.

An aqueous phase was prepared composed of 22 parts water, 12 parts 95% ethyl alcohol, 14 parts 1.3-butylene glycol, 3 parts oleyl alcohol and 2.5 parts of polyoxyethylene lauryl ether containing 4 mols of oxyethylene units per mol (Brij 30).

A propellant solution was formed of polyisobutyl methacrylate molecular weight 100,000, 33 parts in 39 parts Propellant 114 1,2-dichlorotetrafluoroethane, and 35 parts Propellant 12 dichlorodifluoromethane. To this was added 21.5 parts of mineral oil, 190 SSU at 25°C.

The two phases were thoroughly mixed under pressure, forming an oil-in-water emulsion which was packaged into aerosol cans. The composition was expelled from the aerosol can into the palm of one hand and formed into a pad. The pad was initially wet to the touch, and when squeezed freely exuded a cosmetic moisturizing lotion for application to the skin, composed of an aqueous phase of the alcohols and mineral oil emulsified by the polyoxyethylene lauryl ether.

EXAMPLE 17

An oil-in-water emulsion suitable for use in preparing applicator pads for the relief of muscular aches was prepared as follows.

An aqueous phase was prepared composed of 31 parts water, 19 parts 95% ethyl alcohol and 2 parts triethanolamine lauryl sulfate with 7 parts of oleyl alcohol dispersed therein.

A propellant solution of polyisobutyl methacrylate Elvacite 2045 22 parts by weight was prepared in 77 parts by weight Propellant 114 1,2-dichlorotetrafluoroethane and 28 parts by weight Propellant 12 dichlorodifluoromethane.

One part by weight of methyl nicotinate was dispersed in the aqueous phase, and the two phases were then thoroughly mixed forming an oil-in-water emulsion. The emulsion was packaged in aerosol cans.

The composition was expelled from the aerosol can into the palm of one hand and formed into a pad. An aqueous phase was readily expelled from the foamed pad containing methyl nicotinate as a rubefacient or counterirritant together with the alcohols.

This composition after ageing in the cans for from four to six weeks gave pads having a texture and cohexiveness superior to the pads obtained initially.

EXAMPLE 18

An oil-in-water emulsion suitable for use in preparing antiseptic applicator pads containing menthol for the relief of psoriasis was prepared as follows.

An aqueous phase was prepared composed of 21 parts water, 1 part menthol and 2.3 parts of polyoxyethylene lauryl ether containing 4 mols oxyethylene units per mol (Brij 30).

This solution was combined with cellulose acetate butyrate EAB 451-1 20 parts by weight and 55 parts Propellant 142 B 1-chloro-1,1-difluoroethane. These compositions were thoroughly mixed under pressure in aerosol cans. They were then stored in an oven at 60°C overnight, and again mixed by shaking. An oil-in-water emulsion was formed.

The composition was expelled from the aerosol can into the palm of one hand and formed into a pad. The plastic foamed pad readily exuded an aqueous phase containing an antiseptic solution of isopropyl alcohol in water containing menthol for the relief of psoriasis.

EXAMPLE 19

An oil-in-water emulsion suitable for use in preparing applicator pads for the treatment of acne skin conditions was prepared as follows.

An aqueous phase was prepared composed of 21 parts by weight of water, 21 parts by weight of isopropyl alcohol, 1 part by weight resorcinol and 2.3 parts by weight polyoxyethylene lauryl ether containing 4 mols of oxyethylene units per mol (Brij 30).

A propellant solution of cellulose acetate butyrate EAB 451-1 20 parts by weight was prepared in 55 parts by weight of Propellant 142B 1-chloro-1,1-difluoroethane.

These two solutions were thoroughly mixed, forming an oil-in-water emulsion which was packaged in aerosol cans.

The emulsion was expelled from the aerosol can into the palm of one hand and formed into pads. A plastic foamed pad was produced which readily exuded an aqueous phase containing the isopropyl alcohol, resorcinol and the polyoxyethylene lauryl ether, the latter providing an effective cleansing and skin-drying action with the resorcinol acting as a counterirritant.

EXAMPLE 20

An oil-in-water emulsion suitable for use in preparing an applicator pad for treatment of hemorrhoids was prepared as follows.

An aqueous phase was prepared composed of 36 parts water, 2.2 parts Brij 30, polyoxyethylene lauryl ether containing 4 mols of oxyethylene units per mol, 4.5 parts isopropyl alcohol, 0.2 part pramoxine hydrochloride and 0.1 part of diisobutylphenoxyethoxyethyl dimethylbenzyl ammonium chloride, the latter serving as a germicide and the pramoxine hydrochloride serving as an analgesic.

A propellant phase was prepared composed of a solution of polyvinyl acetate Vinylite AYAT 28.5 parts by weight dissolved in 55 parts by weight of Propellant 142B 1-chloro-1,1-difluoroethane.

The two solutions were thoroughly mixed, forming an oil-in-water emulsion, with the diisobutylphenoxyethoxyethyl dimethylbenzyl ammonium chloride and pramoxine hydrochloride in the aqueous phase. The resulting oil-in-water emulsions were packaged in aerosol cans.

The emulsion was expelled from the aerosol can into the palm of one hand and formed into pads. A plastic foam was produced which was intially dry to the touch, but which when squeezed exuded the aqueous solution of the germicide and the analgesic. The pad could be used as an applicator for these materials to hermorrhoids with effective results.

Having regard to the foregoing disclosure, the following is climed as the inventive and patentable embodiments thereof:

1. An oil-in-water propellant emulsion comprising a film-forming synthetic polymer, an additive, a liquid propellant boiling below 45°F. at atmospheric pressure, a foam-stabilizing agent and water, in a continuous aqueous phase and a discontinuous propellant phase; the foam-stabilizing agent and water comprising the continuous aqueous phase, and the continuous aqueous phase comprising from about 10% to about 75% by weight of the total emulsion; and the film-forming synthetic polymer being in solution in the propellant phase, the propellant phase comprising from about 10% to about 70% dissolved polymer, and from about 90% to about 25% by weight of the total emulsion; and the propellant being retained in the liquid phase at a superatmospheric pressure; the emulsion quickly forming upon rapid volatilization of the propellant at atmospheric temperature and pressure a coherent, voluminous foamed structure composed of a matrix of synthetic polymer containing cells or pores; and the additive being dispersed or dissolved in the emulsion and deposited with the continuous aqueous phase in the cells or pores of the structure when the propellant volatizes, and removable in liquid form from the cells or pores of the structure.

2. An oil-in-water propellant emulsion according to claim 1, in which the synthetic polymer is selected from the group consisting of cellulose derivatives, vinyl polymers and vinyl copolymers.

3. An oil-in-water propellant emulsion according to claim 2, in which the vinyl polymer is a methacrylate polymer or copolymer.

4. An oil-in-water propellant emulsion according to claim 3, in which the vinyl polymer is polyisobutyl methacrylate.

5. An oil-in-water propellant emulsion according to claim 1, in which the additive is an antiperspirant.

6. An oil-in-water propellant emulsion in accordance with claim 1, in which the additive is in solution in the propellant.

7. An oil-in-water propellant emulsion in accordance with claim 1, in which the additive is in solution in the water phase.

8. An oil-in-water propellant emulsion in accordance with claim 1, in which the additive is dispersed in the water phase.

9. An oil-in-water propellant emulsion in accordance with claim 1, in which the additive is dispersed in the propellant phase of the emulsion.

10. An oil-in-water propellant emulsion according to claim 1, in which the foam-stabilizing agent is selected from the group consisting of organic surfactants and hydrophhilic substances forming a colloidal solution or dispersion in water.

11. An oil-in-water propellant emulsion according to claim 1 wherein the liquid propellant is inert to the synthetic polymer; wherein the additive is in liquid or solid form at atmospheric temperature and pressure in an amount in excess of any solubility of the additive in the polymer in the absence of the propellant, the additive being substantially inert to the synthetic polymer and to the propellant, the foamed structure being in a shaped form for immediate use as a pad from which the additive can be removed in liquid form by compression of the pad.

12. An oil-in-water propellant emulsion according to claim 11 which, upon rapid volatilization of the propellant at atmospheric temperature and pressure, forms a foamed polymeric structure which immediately is non-sticky, coherent, voluminous and self-supporting, which contains the additive, and which is in a shaped form for immediate use as a pad from which the aqueous phase and the additive can be removed in liquid form by compression of the pad.

13. An oil-in-water propellant emulsion according to claim 12 in which the aqueous phase contains from about 0.01 to about 20% by weight of the foam-stabilizing agent, in which the composition contains from about 25 to about 60% by weight of the aqueous phase and the propellant phase contains from about 10% to about 50% by weight of the synthetic polymer.

14. An oil-in-water propellant emulsion according to claim 13 in which the polymer is dissolved in a liquid comprising, in addition to the liquid propellant, a solvent which has a boiling point above 45°F., the solvent being present in an amount not exceeding two times the weight of polymer and not exceeding the weight of propellant.

15. An oil-in-water propellant emulsion according to claim 13 in which the polymer is polyisobutyl methacrylate.

16. An oil-in-water propellant emulsion according to claim 1 in which the additive is selected from the group consisting of antimicrobial agents, coating compositions, fungistatic agents, fungicidal agents, abrasives, detergents, antibiotics, antiperspirants, medicaments, silicone oils, mineral oils and vegetable oils.

17. An oil-in-water propellant emulsion comprising a film-forming synthetic polymer, a liquid propellant boiling below 45°F. at atmospheric pressure, a foam-stabilizing agent and water, in a continuous aqueous phase and a discontinuous propellant phase; the foam-stabilizing agent and water comprising the continuous aqueous phase, and the continuous aqueous phase comprising from about 10% to about 75% by weight of the total emulsion; and the film-forming synthetic polymer being in solution in the propellant phase; the propellant phase comprising from about 10% to about 70% dissolved polymer, and from about 90% to about 25% by weight of the total emulsion; and the propellant being retained in the liquid phase at a superatmospheric pressure; the emulsion quickly forming upon rapid volatilization of the propellant at atmospheric temperature and pressure a coherent, voluminous foamed structure composed of a matrix of synthetic polymer containing cells or pores; the foam-stabilizing agent being deposited with the continuous aqueous phase in the cells or pores of the structure when the propellant volatilizes and being removable in liquid form from the cells or pores of the structure by compressing the structure.

18. An oil-in-water propellant emulsion according to claim 17 wherein the liquid propellant is inert to the synthetic polymer; wherein the foam-stabilizing agent is in liquid or solid form at atmosphheric temperature and pressure in an amount in excess of any solubility of the foam-stabilizing agent in the polymer in the absence of the propellant, the foam-stabilizing agent being substantially inert to the synthetic polymer and to the propellant, the foamed structure being in a shaped form for immediate use as a pad from which the foam-stabilizing agent can be removed in liquid form by compression of the pad.

19. An oil-in-water propellant emulsion according to claim 18 which, upon rapid volatilization of the propellant at atmospheric temperature and pressure, forms a foamed polymeric structure which immediately is non-sticky, coherent, voluminous and self-supporting, which contains the foam-stabilizing agent, and which is in a shaped form for immediate use as a pad from which the aqueous phase and the foam-stabilizing agent can be removed by compression of the pad.

20. An oil-in-water propellant emulsion according to claim 19 in which the aqueous phase contains from about 0.01 to about 20% by weight of the foamstabilizing agent, in which the composition contains from about 25 to about 60% by weight of the aqueous phase, and the propellant phase contains from about 10% to about 50% by weight of the synthetic polymer.

21. An oil-in-water propellant emulsion according to claim 20 in which the polymer is dissolved in a liquid comprising, in addition to the liquid propellant, a solvent which has a boiling point above 45° F., the solvent being present in an amount not exceeding the weight of propellant.

22. An oil-in-water propellant emulsion according to claim 21 in which the polymer is polyisobutyl methacrylate.

23. An oil-in-water propellant emulsion according to claim 23 in which the synthetic polymer is selected from the group consisting of cellulose derivatives, vinyl polymers and vinyl copolymers.

24. An oil-in-water propellant emulsion acording to claim 24 in which the vinyl polymer is a methacrylate polymer or copolymer.

25. An oil-in-water propellant emulsion according to claim 25 in which the foam-stabilizing agent is selected from the group consisting of organic surfactants and hydrophilic substances forming a colloidal solution or dispersion in water.

26. A process for forming a foamed structure, which comprises expelling from a closed container an oil-in-water propellant emulsion according to claim 1, and volatilizing the propellant at atmospheric temperature and pressure to foam the synthetic polymer and form a foamed structure containing the additive in the cells or pores thereof.

27. A process according to claim 26, in which the emulsion is expelled from an aerosol container by one hand into the other hand, and a foamed structure in the form of an applicator pad is formed in the other hand, ready for use to apply the additive to a surface.

28. A process according to claim 27 which comprises the additional step of removing the additive in liquid form from the pad.

29. A process according to claim 28, in which the liquid propellant in the aerosol composition is inert to the synthetic polymer, the additive is substantially inert to the synthetic polymer and the propellant, and is in liquid or solid form at atmospheric temperature and pressure in an amount in excess of any solubility of the additive in the polymer in the absence of the propellant.

30. A process according to claim 29 wherein the aqueous phase and the additive are removed in liquid form from the pad by compression of the pad.

31. A process according to claim 29 wherein the aqueous phase contains from about 0.01 to about 20% by weight of the foam-stabilizing agent, and wherein the liquid aerosol composition contains from about 25 to about 60% by weight of the aqueous phase, and the propellant phase contains from about 10% to about 50% by weight of the synthetic polymer.

32. A process according to claim 31 wherein the polymer is dissolved in a liquid comprising, in addition to the liquid propellant, a solvent which has a boiling point above 45°F., the solvent being present in an amount not exceeding two times the weight of polymer and not exceeding the weight of propellant.

33. A process according to claim 31 wherein the polymer is polyisobutyl methacrylate.

34. A process for forming a foamed structure, which comprises expelling from a closed container an oil-in-water propellant emulsion according to claim 17, and volatilizing the propellant at atmospheric temperature and pressure to foam the synthetic polymer and form a foamed structure containing the foam-stabilizing agent in the cells or pores thereof.

35. A process according to claim 34, in which the emulsion is expelled from an aerosol contained by one hand into the other hand, and a foamed structure in the form of an applicator pad is formed in the other hand, ready for use to apply the foam-stabilizing agent to a surface.

36. A process according to claim 35 which comprises the additional step of removing the foam-stabilizing agent in liquid form from the pad.

37. A process according to claim 36, in which the liquid propellant in the aerosol composition is inert to the synthetic polymer, the additive is substantially inert to the synthetic polymer and the propellant, and is in liquid or solid form at atmospheric temperature and pressure in an amount in excess of any solubility of the additive in the polymer in the absence of the propellant.

38. A process according to claim 37, wherein the aqueous phase and the foam-stabilizing agent are removed in liquid form from the pad by compression of the pad.

39. A process according to claim 38 wherein the aqueous phase contains from about 0.01 to about 20% by weight of the foam-stabilizing agent, and wherein the liquid aerosol composition contains from about 25 to about 60% by weight of the aqueous phase, and the propellant phase contains from about 10% to about 50% by weight of the synthetic polymer.

40. A process according to claim 39 wherein the polymer is dissolved in a liquid comprising, in addition to the liquid propellant, a solvent which has a boiling point above 45° F., the solvent being present in an amount not exceeding two times the weight of polymer and not exceeding the weight of propellant.

41. A process according to claim 39 wherein polymer is polyisobutyl methacrylate.

42. A process according to claim 41 wherein the additive is in solution in the aqueous phase.

43. A process according to claim 41 wherein the additive is dispersed in the aqueous phase.

44. A process according to claim 41 wherein the additive is dispersed in the propellant phase.

45. A process according to claim 41 wherein the additive is in solution in the propellant phase.

* * * * *

UNITED STATES PATENT OFFICE
CERTIFICATE OF CORRECTION

Patent No. 3,912,666            Dated October 14, 1975

Inventor(s) J. George Spitzer et al

It is certified that error appears in the above-identified patent and that said Letters Patent are hereby corrected as shown below:

| | | |
|---|---|---|
| Column 6, line 56 | : | "an" should be --on-- |
| Column 9, line 13 | : | "formed" should be --from-- |
| Column 10, line 21 | : | "or" should be "of" |
| Column 11, line 12 | : | "aqueousphase" should be --aqueous phase-- |
| Column 20, line 17 | : | "aantiperspirant" should be --antiperspirant-- |
| Column 21, line 46 | : | "cohexiveness" should be --cohesiveness-- |
| Column 22, line 56 | : | "climed" should be --claimed-- |
| Column 23, line 42 | : | "hydrophhilic" should be --hydrophilic-- |
| Column 24, line 47 | : | "atmosphheric" should be --atmospheric-- |
| Column 25, line 15 | : | "23" should be --17-- |
| Column 25, line 19 | : | "24" should be --23-- |
| Column 25, line 22 | : | "25" should be -- 23 -- |

Signed and Sealed this

Twenty-seventh Day of July 1976

[SEAL]

Attest:

RUTH C. MASON            C. MARSHALL DANN
*Attesting Officer*            *Commissioner of Patents and Trademarks*